C. W. NEAL.
LOCK NUT.
APPLICATION FILED SEPT. 13, 1911.
1,089,945.
Patented Mar. 10, 1914.
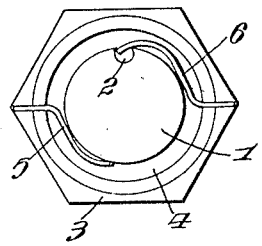
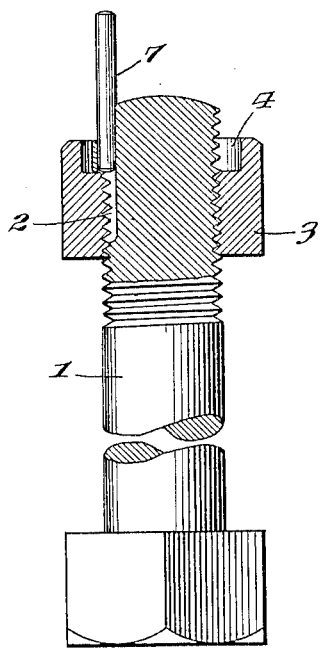
Inventor
Charles W. Neal
Witnesses
M. H. Slifer.
Wm. J. Booth.
By Victor J. Evans
Attorney

UNITED STATES PATENT OFFICE.

CHARLES WATSON NEAL, OF CHERAW, SOUTH CAROLINA, ASSIGNOR OF TWO-THIRDS TO WILLIAM MITCHELL AND ONE-THIRD TO SAMUEL M. FINKLEA, BOTH OF CHERAW, SOUTH CAROLINA.

LOCK-NUT.

1,089,945.  Specification of Letters Patent.  Patented Mar. 10, 1914.

Application filed September 13, 1911. Serial No. 649,103.

*To all whom it may concern:*

Be it known that I, CHARLES W. NEAL, a citizen of the United States, residing at Cheraw, in the county of Chesterfield and State of South Carolina, have invented new and useful Improvements in Lock-Nuts, of which the following is a specification.

This invention relates to certain and novel improvements in lock nuts.

In carrying out my invention it is my purpose to provide an ordinary nut and bolt with means whereby the said nut will be effectively secured upon the bolt to prevent the removal of the same, but which is provided with separable means whereby the said nut may be easily and quickly removed when desired.

With the above objects in view, the invention resides in the novel construction and combination of parts hereinafter fully described and claimed.

In the drawings,—Figure 1 is a front elevation of a nut and bolt constructed in accordance with the present invention. Fig. 2 is a longitudinal sectional view of the same illustrating the manner of removing the nut from the bolt.

Referring now to the drawings in detail, the numeral 1 designates a bolt having its ends provided with the usual threads. The bolt 1 in the present instance is formed with a channel or depression 2 which extends a suitable distance from the end of the bolt and which intersects the threads of the bolt.

The numeral 3 designates a nut. This nut is of the ordinary construction, but has its outer face formed with an annular depression 4. A pair of springs 5 and 6 have their outermost terminal portions 7' recessed within the annular depression 4 and terminating flush with the corners 8' of the nut whereby positioning the said springs in diametrically opposed relation one to the other. The said springs have their opposed free terminal portions 9' curved in opposite directions and of such length as to quarterly embrace the threaded exterior surface of the bolt 1 and lie in the path of movement of the depression 2 and adapted to alternately engage the depression 2 upon the feeding of the bolt.

The numeral 7 designates a pin which is adapted to be inserted within the recess or depression of the bolt and to lie in a line parallel with the threaded portion of the said bolt, so as to fill the space provided by the depression and to prevent the ends of the arcuate springs engaging with the said depression, and thus providing for the removal of the nut from the bolt.

Having thus described the invention, what I claim is:—

In combination with a bolt having a longitudinal groove therein of U-shaped configuration, a nut threadedly mounted on the bolt and provided with an annular channel in one of its surfaces, a spring carried by the nut and arranged within the said annular channel, said spring having one of its ends secured radially of the bolt and having its free end provided with a portion arranged at a tangent to the bolt, and terminally extended upwardly toward the outer wall of the annular channel and then extended inwardly and engaging one of the straight walls of the groove in the bolt and providing an outer longitudinal convexity arranged at an angle to the outer wall of the channel, and an inner longitudinal concavity extending beyond and in spaced relation to the inner curved wall of the groove.

In testimony whereof I affix my signature in presence of two witnesses.

CHARLIE WATSON NEAL.

Witnesses:
R. T. CASTON,
S. M. FINKLEA.

Copies of this patent may be obtained for five cents each, by addressing the "Commissioner of Patents, Washington, D. C."